(12) United States Patent
Hsu (10) Patent No.: US 7,262,700 B2
(45) Date of Patent: Aug. 28, 2007

(54) INDUCTIVE POWERING SURFACE FOR POWERING PORTABLE DEVICES

(75) Inventor: Feng-Hsiung Hsu, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 211 days.

(21) Appl. No.: 11/128,510

(22) Filed: May 13, 2005

(65) Prior Publication Data

US 2006/0202665 A1 Sep. 14, 2006

Related U.S. Application Data (60) Provisional application No. 60/660,524, filed on Mar. 10, 2005.

(51) Int. Cl.
*G08B 13/14* (2006.01)
(52) U.S. Cl. .............................. 340/572.1; 340/568.1; 340/645; 340/568.8; 336/118; 336/130
(58) Field of Classification Search ............ 340/572.1, 340/571, 568.1, 568.8, 645, 545.3, 646, 686.5, 340/3.6; 320/108; 307/104, 150; 336/118, 336/119, 130, 131
See application file for complete search history.

(56) References Cited

U.S. PATENT DOCUMENTS

| | | | | |
|---|---|---|---|---|
| 6,367,701 | B1 * | 4/2002 | Fries | 235/486 |
| 6,462,509 | B1 * | 10/2002 | Abe et al. | 320/108 |
| 6,803,744 | B1 * | 10/2004 | Sabo | 320/108 |
| 7,077,179 | B1 * | 7/2006 | Camiano et al. | 144/286.1 |
| 7,106,246 | B1 * | 9/2006 | Lindell | 342/51 |
| 7,164,255 | B2 * | 1/2007 | Hui | 320/108 |

FOREIGN PATENT DOCUMENTS

WO    WO 0016236    * 3/2000

OTHER PUBLICATIONS

Koichi Hatanaka Power Transmission of a Desk with a cord-Free power Supply, Sep. 5, 2002.*
Murakami, J. et al., "Consideration on Cordless Power Station-Contactless Power Transmission System", *IEEE Trans. Magn.*, vol. 32, pp. 5037-5039 (Sep. 1996).
Hatanaka, F., et al., "Coil Shape in a Desk-Type Contactless Power Station System", *J. Magn. Soc. Jpn.*, vol. 25, pp. 1015-1018 (2001).(*Abstract, partial/only).
Hatanaka, Koichi et al., "Power Transmission of a Desk with a Cord-Free Power Supply", *IEEE Transactions on Magnetics*, vol. 38, No. 5, Sep. 2002, pp. 3329-3331.

* cited by examiner

*Primary Examiner*—Benjamin C. Lee
*Assistant Examiner*—Daniel Previl
(74) *Attorney, Agent, or Firm*—Lee & Hayes, PLLC (57) ABSTRACT

An inductive powering device provides power to a portable device via inductive coupling between primary coils in the surface of the powering device and a secondary coil in the portable device. The portable device includes a passive locator device, such as an RFID device, to allow the primary coils of the inductive powering surface to detect the presence and location of the secondary coil, and only primary coils adjacent the secondary coil are energized for power transfer. A cost-effective driving configuration that arranges the primary coils into a matrix with drive circuits switchably connected to the row and columns is used to energize the primary coils.

20 Claims, 7 Drawing Sheets

INDUCTIVE POWERING SURFACE FOR POWERING PORTABLE DEVICES

RELATED APPLICATION

This application claims the priority of U.S. Provisional Application 60/660,524, filed on Mar. 10, 2005.

TECHNICAL FIELD

This invention relates generally to portable devices such as laptop computers, tablet PC's, PDA's, etc., and more particularly to a device that utilizes an inductive power transfer mechanism to power portable devices.

BACKGROUND OF THE INVENTION

Portable computing devices such as laptop computers, tablet PC's, email accessing devices, PDA's, etc. are becoming increasing popular and have become indispensable tools for many users. With the advancements in computer and network technologies, the portable devices are more and more powerful and versatile, and a great emphasis in computer hardware development is placed on further enhancing the mobility of such devices. Nevertheless, one major technical obstacle that has been hindering the mobility of portable devices is that those devices need power to operate, and replenishing the power typically requires the use of a power cord. For instance, a typical laptop computer is recharged by using a dedicated external power supply that functions as an AC-DC converter. Such a power supply is bulky and heavy, and may be unusable when the user travels to a region with a different AC voltage standard. Similarly, PDA's and email access devices often have to be recharged by placing them in a docking station. A frustrating scenario frequently experienced by users of portable devices is that the portable device runs out of power and its external power supply or charger is unavailable or unusable, rendering the portable device useless.

One solution that has been proposed to allow a portable device to be powered or recharged without the attachment of a power cord is to transfer power via inductive coupling. To that end, the portable device is provided with a secondary coil connected to its power supply circuit, and a powering device is provided with a surface that has at least one primary coil built into it. To power the device, the device is placed on the surface of the powering device such that the primary and secondary coils are in close proximity so that they can inductively interact with each other to form a transformer. The primary coil is energized at a selected frequency, such as 100 KHz, and power is transferred to the power supply circuit of the portable device via the inductive coupling between the primary and secondary coils.

One such inductive powering device for portable devices has been proposed in "Power Transmission of a Desk with a Cord-Free Power Supply," Hoichi Hatanaka, et al., pp. 3329-3331, IEEE Transaction on Magnetics, vol. 38, no. 5, September 2002. In that example, a plurality of primary coils are distributed over the surface of a desk-type power station. Each primary coil has its own driving circuit sensing and powering circuit. The portable device has an active secondary coil with a 500 KHz oscillator. When the portable device is placed on the desk surface, the active oscillator of the secondary coil is activated so that the primary coils can sense the presence of the secondary coil. Only those primary coils overlapping with the secondary coil are then energized to transfer power to the portable device. One fundamental problem with this arrangement is that the oscillator circuit of the secondary coil requires power to operate. If the battery of the portable device is completely drained, there is no power available to operate the oscillator circuit. As a result, the portable device cannot be recharged, since the desk-type power station cannot sense its presence and thus will not energize the primary coils to transfer power to it. Another problem with this arrangement is that the number of drive circuits for the primary coils is proportional to area of the desk surface, and the cost for the drive circuits can be quite high for a large desk surface.

SUMMARY OF THE INVENTION

In view of the foregoing, the present invention provides a powering device for providing power to a portable device. The powering device has a plurality of primary coils that can be energized to transfer power via inductive coupling with a secondary coil in the portable device, when the portable device is placed on the inductive powering surface. In accordance with a feature of the invention, the portable device uses a passive locator component that allows the primary coils of the inductive powering surface to detect the presence and location of the secondary coil. The passive detection means may be an RFID chip that uses the secondary coil or a separate sensing coil as its antenna. The RFID chip may be configured to transfer power requirements of the portable device to the controller of the powering surface. When the portable device is placed on the inductive powering surface, the primary coils interact with the passive locator component to sense the presence of the portable device and start to transfer power to the portable device by energizing the primary coils adjacent the secondary coil.

In accordance with another aspect of the invention, the primary coils in the inductive powering surface are arranged into a matrix with rows and columns, with the coils in each row or column switchably connected to a drive circuit. To energize a selected primary coil, the row and column of that coil are switched on. This arrangement allows the cost of the powering device to be significantly reduced as compared to the prior art, because the number of switchable drive circuits required is proportional to the linear dimensions of the powering surface, instead of its area.

DETAILED DESCRIPTION OF THE INVENTION

Figure 1:
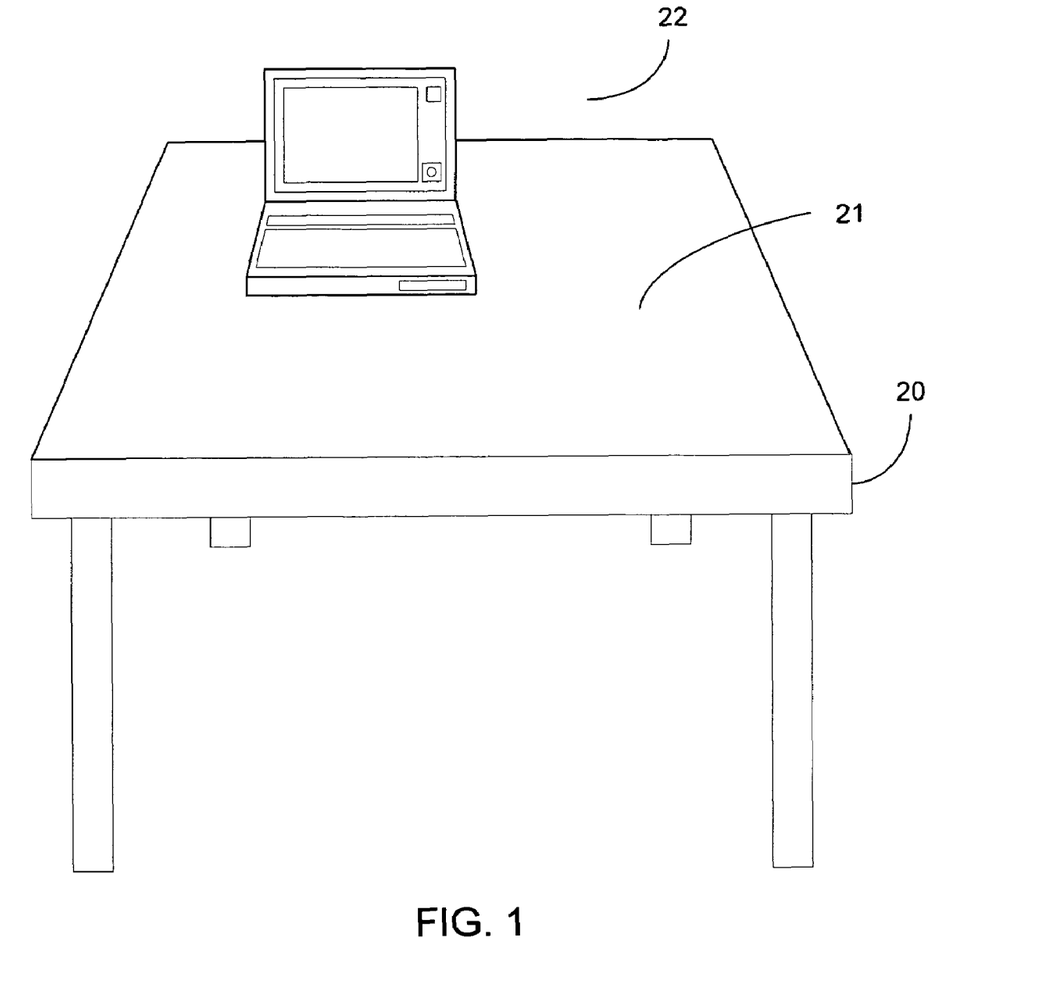
FIG. 1 is a schematic view of a portable device and a powering device for delivering power to the portable device via inductive coupling.

Turning to the drawings, wherein like reference numerals refer to like elements, the invention provides a powering device 20 with an inductive powering surface 21 for powering a portable device placed on the surface. The powering device 20 may be in the form of, for example, a computer desk, a conference table, a night stand, or a powering pad, etc. There are no particular limitations on the shape and form of the powering device. A significant advantage of using the inductive powering surface 21 to transfer power to a portable device 22 is that no electrical contact or connection has to be made to power the portable device. This can provide significant convenience to users of portable devices. For example, if the powering device 20 is a conference table, users participating in a meeting only have to place their laptop computers or tablet PC's on the surface of the table, and their portable devices will be automatically powered or recharged by the table surface. As a result, the users do not have to worry about their portable devices running out of power over a long meeting, or to look for AC wall outlets to plug in the external chargers for their portable devices.

Figure 2:
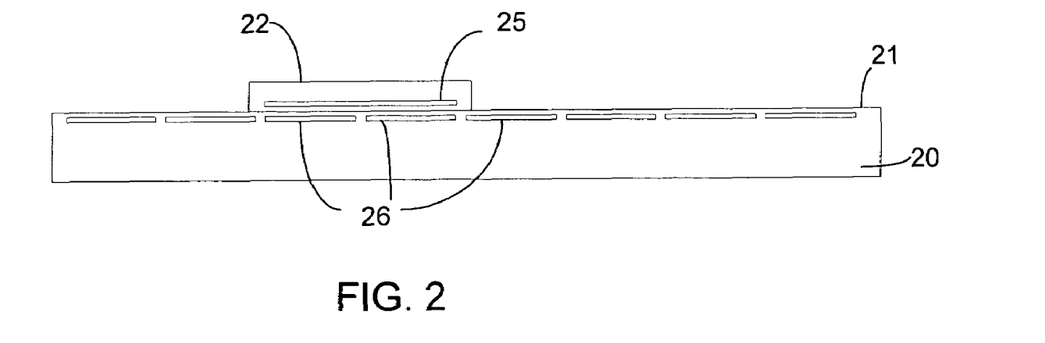
FIG. 2 is a schematic side view of a portable device with a secondary coil placed on a powering surface that has a plurality of primary coils for transferring power to the portable device via inductive coupling with the secondary coil.

Turning now to FIG. 2, the power transfer from the inductive powering surface 21 to the portable device 22 is by means of the inductive coupling between a primary coil 26 in the inductive powering surface and a second primary coil 25 in the portable device. The primary coil 26 and secondary coil 25 form a transformer. When the primary coil 26 is driven with an alternating signal at a selected frequency, the variation of the magnetic flux is picked up by the secondary coil 25 and induces an alternating voltage signal across the secondary coil. The alternating voltage signal can then be converted into power by a power supply circuit in the portable device for powering the operations of the portable device.

Figure 6:
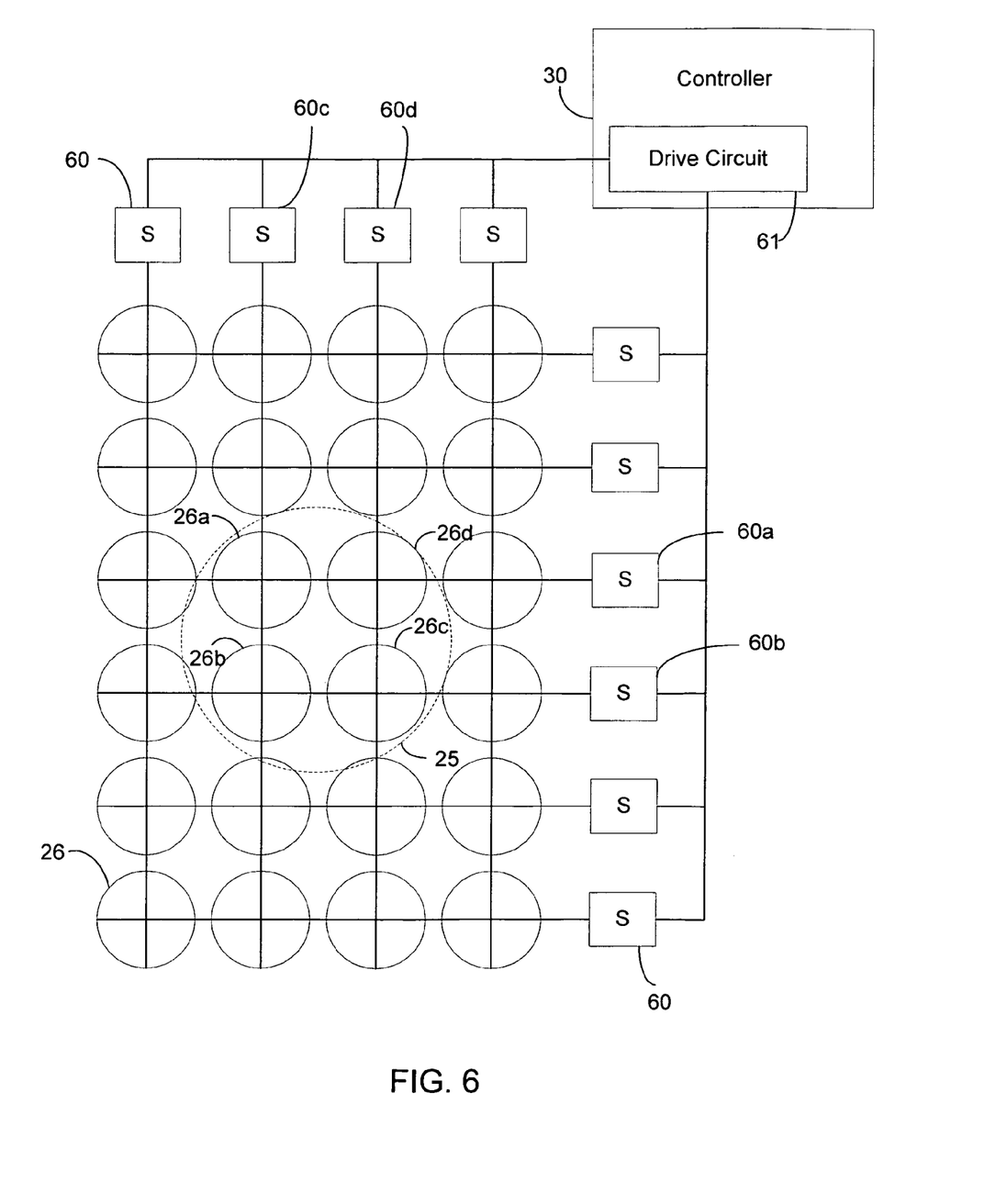
FIG. 6 is a schematic representation of an embodiment of the powering surface in which a plurality of primary coils are arranged into rows and columns that are switchably connected to a drive circuit to energize selected primary coils.

In accordance with an aspect of the invention, the inductive powering surface 21 has a plurality of primary coils 26 arranged therein that can be energized for transferring power to the portable device 22 placed on the surface. One example of the multi-coil arrangement in the inductive powering surface is shown in FIG. 6 and will be described in greater detail below. To maximize the efficiency of power transfer and to reduce RF interference or unwanted exposure of the user to the transmitted power, only those primary coils covered by or overlapping with the secondary coil 25 in the portable device are to be energized for power transfer. This requires the ability of the powering device 20 to detect the presence and location of the secondary coil 25 on the inductive powering surface 21.

In accordance with a feature of the invention, the secondary coil 25 of the portable device is provided with a "passive" locator device or component for the primary coils in the inductive powering surface to detect its presence and location when the portable device is placed on the powering surface. In one preferred embodiment, the passive locator device is an RFID-type device. Generally, an RFID (radio frequency identification) device is made up of a microchip with an antenna, which is typically in the form of a coil. The RFID device interacts with a reader device, which sends out radio frequency waves, the magnetic fields of which are picked up by the antenna of the RFID device. A passive RFID device creates power from the detected magnetic fields, and uses the power to energize the RFID microchip. This power allows the microchip to send information back to the reader in the form of radio-frequency waves. The radio-frequency waves sent by the RFID device are picked up by the antenna of the reader and decoded by the reader to retrieve the information.

As used herein, the word "passive" in the context of the invention means that the locator device does not have to draw current from the internal power source (e.g., a battery or fuel cell) of the portable device for its operation. Thus, the powering device 20 can determine the presence and location of the portable device on its surface and start to transfer power to the portable device, even if the internal power source of the portable device has been depleted.

Figure 3:
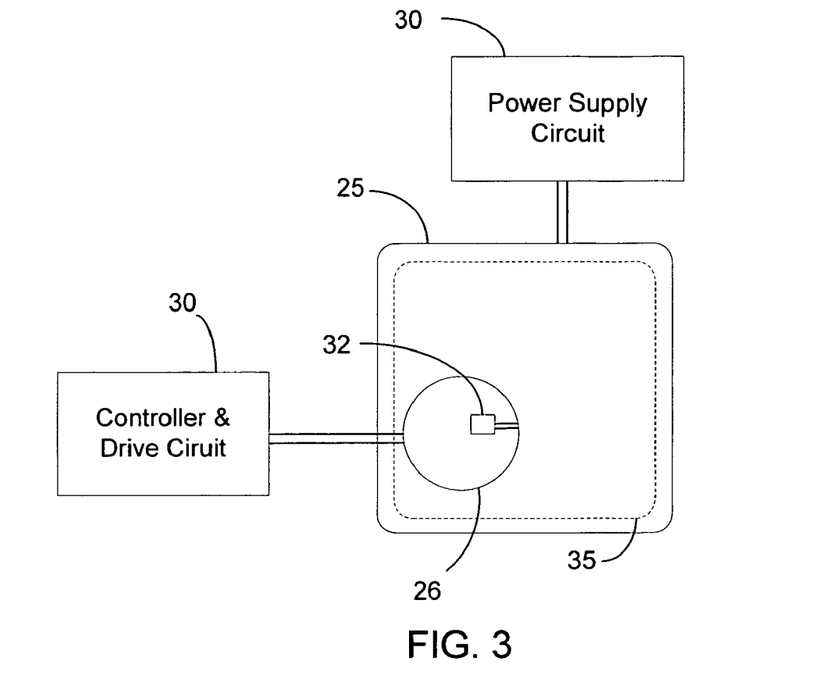
FIG. 3 is a schematic diagram showing one embodiment in which the portable device has an RFID chip using the secondary coil as its antenna to allow sensing by primary coils in the powering surface.

Referring to FIG. 3, in accordance with the invention, a controller 30 of the powering device 20 serves the function of the RFID reader, and the primary coils 26 of the powering surface are used as antennas for transmitting radio frequency waves to the RFID microchip 32 of the passive portable device and receiving the radio waves returned by the RFID microchip. For clarity of illustration, only one primary coil 26 is shown in FIG. 3. The controller 30 has driver circuits for energizing the primary coil 26 at selected frequencies, and has circuitry for decoding radio frequency signals received by the primary coil and to retrieve information contained therein.

In accordance with a feature of a preferred embodiment, the secondary coil 25 for powering the portable device is used as the antenna of the passive locator device. As shown in FIG. 3, the RFID microchip 32 is attached to the secondary coil 25. The radio frequency waves received by the secondary coil are used to power the operation of the RFID microchip 32. The secondary coil 25 is also connected to a power supply circuit 36 of the portable device, which generates power for the regular operations of the portable device 22 when the secondary coil is energized via inductive coupling with the primary coil 26.

Whether the magnetic field variations picked up by the secondary coil 25 is used to power the RFID microchip 32 or the power supply circuit 36 depends on the frequency at which the primary coil 26 is driven. In a sensing mode, the controller 30 drives the primary coil 26 at a relatively high frequency, such as 13.56 MHz, that the RFID microchip 32 is tuned to receive. The power level of the 13.56 MHz oscillation can be fairly low. In a power transfer mode, the primary coil 26 is driven at a different frequency, such as 100 KHz or 200 KHz, that is selected for the power supply circuit of the portable device. In this regard, the sensing frequency and power delivery frequency are significantly different. The wide separation between the two frequencies allows the RFID chip 32 to be isolated from the normal powering circuit of the portable device, such that the power transfer operation will not interfere with the sensing operation or overwhelm the RFID chip. The primary coil 26 can optionally be driven at both the 13.56 MHz and 100 KHz at the same time.

In an alternative embodiment, a separate sensing coil 35 may be used with each primary coil 25. The sensing coils may be arranged in rows and columns over the powering surface and have a suitable shape (e.g., rectangular). The 13.56 MHz signals from the drive circuits are sent to the sensing coils instead of the primary coils, and the return signal from the RFID device is detected by the sensing coil 35.

Using the secondary coil 25 as the antenna for the RFID microchip has the advantage that only one coil is required for both sensing and power delivery operations. It is possible, however, to use two separate coils, one for sensing and the one for power delivery. Such a configuration is used in the embodiment shown in FIG. 4. In this embodiment, a sensing coil 37 is connected to the RFID chip 32, and a separate secondary coil 25 is connected to the power supply circuit 36. The sensing coil 37 is preferably disposed inside and concentric with the secondary coil 25, so that its center location coincides with that of the secondary coil. In this way, the detection of the RFID chip 32 also reveals the location of secondary coil. The sizes of the sending and secondary coils may be selected for their respective functions. For instance, the secondary coil 25 may have a relatively large diameter if the power to be transferred in high. The sensing coil, on the other hand, preferably has a small size to provide better sensing accuracy. The two-coil design has the advantage that the dimensions of the two coils can be optimized respectively for sensing and power transfer operations.

Using a RFID device in the portable device to enable detection by the inductive powering device has the advantage that data pertaining to the portable device may be stored in the RFID microchip and transmitted to the powering device during the sensing operation. It can be especially useful to include in the data certain information regarding the power requirements for the portable device. The powering requirements may include, for example, the maximum idle time between the power transfer operations, the minimum duty cycle for active power transfer, the size of the secondary powering coil, and/or the maximum instant transferred power, etc.

Figure 5:
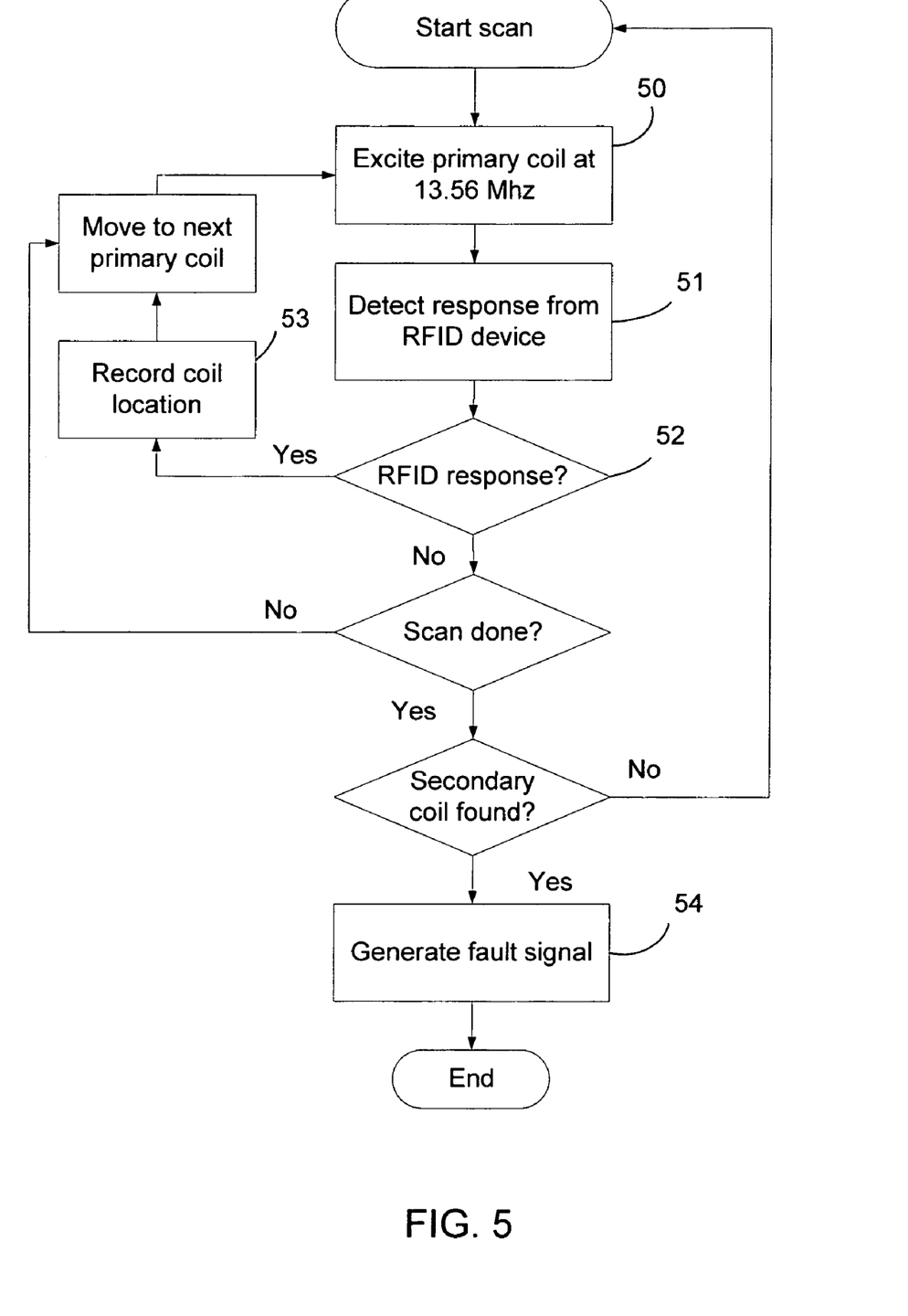
FIG. 5 is a flowchart for a process performed by the powering device to sense the presence and location of the secondary coil of the portable device and subsequently transfer power to the portable device.

As mentioned above, the inductive powering surface has a plurality of primary coils 26, and only those that are covered by or overlapping with the secondary coil 25 are to be energized for transferring power to the portable device. To that end, the controller 36 of the powering device first determines whether any portable device is present on the powering surface and, if so, the location of the secondary coil of that device. Referring to FIG. 5, to detect the presence and location of the secondary coil, the controller scans the primary coils. The scan pattern may be a linearly progressive pattern in which the controller loops through the rows or columns of the primary coils, or may be any other desired pattern. For each primary coil 26, the controller operates an appropriate driver circuit to energize the coil at a sensing frequency, such as 13.56 MHz, and at a lower power level (step 50). If a secondary coil is present and overlaps with that primary coil, the RFID circuit in the portable device will pick up the waves sent by the primary coil (step 51), power up the RFID chip, and return RF waves containing information about the portable device. As mentioned above, the information may include power requirements of the portable device that may be used by the controller to facilitate the power transfer operation. The RF waves returned by the RFID device are picked up by the primary coil (step 52). The detection of the returned waves indicates that a secondary coil is present and overlaps with the primary coil. The location of that primary coil is recorded by the controller. (step 53) In this way, the controller goes through the primary coils according to the scan pattern, and identifies those primary coils that have picked up responses from the RFID device. Those primary coils are then energized at a power delivery frequency, such as 100 KHz (step 54), to transfer power to the portable device via inductive interaction with the secondary coil.

In accordance with another feature of the invention, a cost-effective arrangement for driving the primary coils is provided. FIG. 6 provides an example of such an arrangement. As shown in FIG. 6, the primary coils 26 are arranged generally in a two-dimensional matrix with multiple rows and columns, each row or column can be switchably connected to a drive circuit 61 by means of respective switches 60. The drive circuit may comprise, for example, semiconductor or relay switches, and the drive circuit for each primary coil may be a single switch or multiple switches depending on the circuit configurations. For example, AC-sourced systems may require only a single relay per primary coil, while DC-sourced systems may use up to four transistors per primary coil for switching. A primary coil 26 can be turned on, i.e., energized or excited, when both its row and column are connected to the drive circuit. By way of example, in the example shown in FIG. 6, four primary coils 26*a*, 26*b*, 26*c*, 26*d* overlap with the secondary coil 25. During the scan phase as described above, the controller 26 identifies these four primary coil by means of the RFID transmission. Thereafter, the controller 26 actuates the switches 60*a*, 60*b*, 60*c*, 60*d* to connect the four primary coils 26*a*, 26*b*, 26*c*, 26*d* to the drive circuit, thereby energizing these coils, while the other coils are not energized. The primary coils under the secondary coil 25 are preferably energized in phase as a group to maximize the rate of power transfer to the portable device.

Figure 7A:
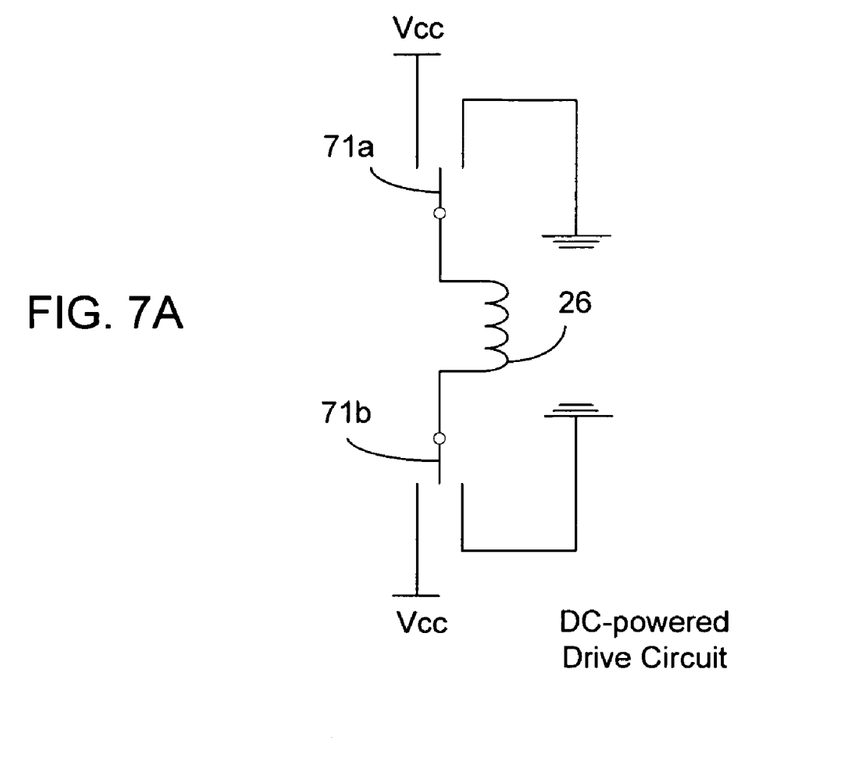
FIG. 7A is a schematic diagram of a DC-powered drive configuration for driving a primary coil.
Figure 7B:
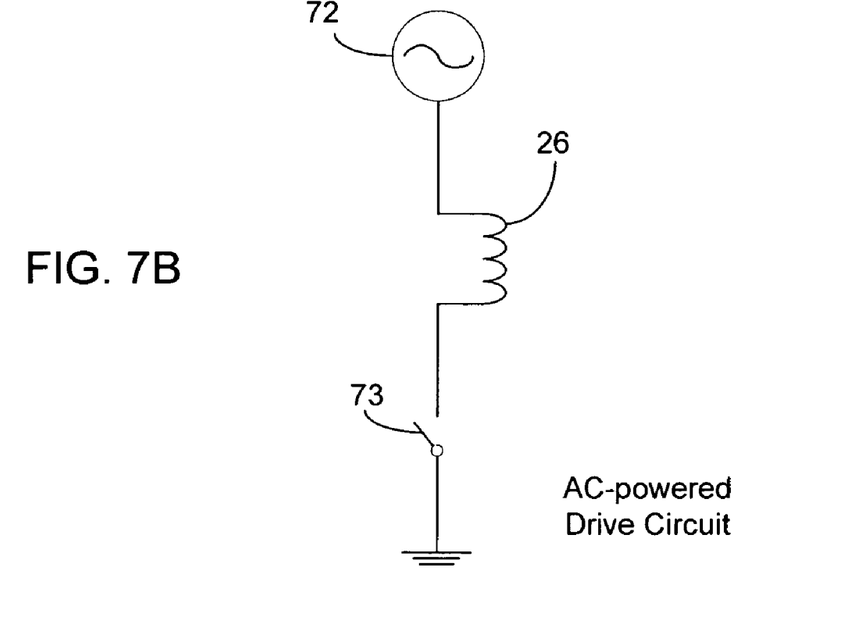
FIG. 7B is a schematic diagram of an AC-powered drive configuration for driving a primary coil.

Different switching mechanisms may be used to selectively energize the selected primary coils, depending whether the drive circuit is DC powered or AC powered. An example of a DC powered drive circuit is shown in FIG. 7A, while an example of an AC-powered drive circuit is shown in FIG. 7B. In the DC powered drive circuit, the two switches 71*a* and 71*b* alternatingly connects the opposite ends of the primary coil 26 between a DC voltage Vcc and the ground, at a frequency that is double the desired coil frequency, which may be either the sending frequency in a sending mode or the power transfer frequency in a power transfer mode. In this configuration, the switch 71*a* may be a row switch, and the switch 71*b* may be a column switch, for the primary coil as described above with reference to FIG. 6. Since the switches 71*a*, 71*b* are operated at relatively high frequencies, fast-switching components, such as high-speed transistors, are used to implement the switches. Typically, one end of the coil drive circuits can be shared among multiple coils either of the same row or of the same column. This means that the minimum number of transistors required for a DC-powered primary coil is two.

In the AC powered drive circuit in FIG. 7B, an oscillating signal at the desired drive frequency is connected to the primary coil by a switch. The oscillating signal is generated by an oscillating circuit 72, and preferably two separate oscillating circuits are used for the sensing and power delivery frequencies, respectively. The switch 73 in this AC configuration does not have to do rapid switching, because the oscillation is provided by the oscillation circuit. In this case, the switch 73 may be implemented with an MEMS-based micro-relay chip, which may be a low-cost solution. Other types of switching devices, including reed relays, can also be used.

Figure 8A:
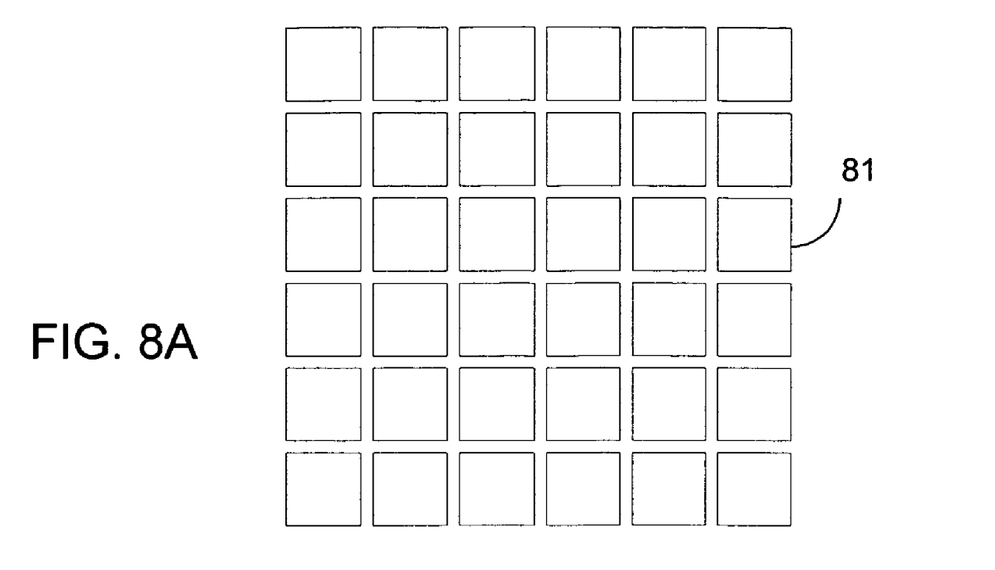
FIGS. 8A and 8B are two arrangements of primary coils that use square and hexagonal coils, respectively.
Figure 8B:
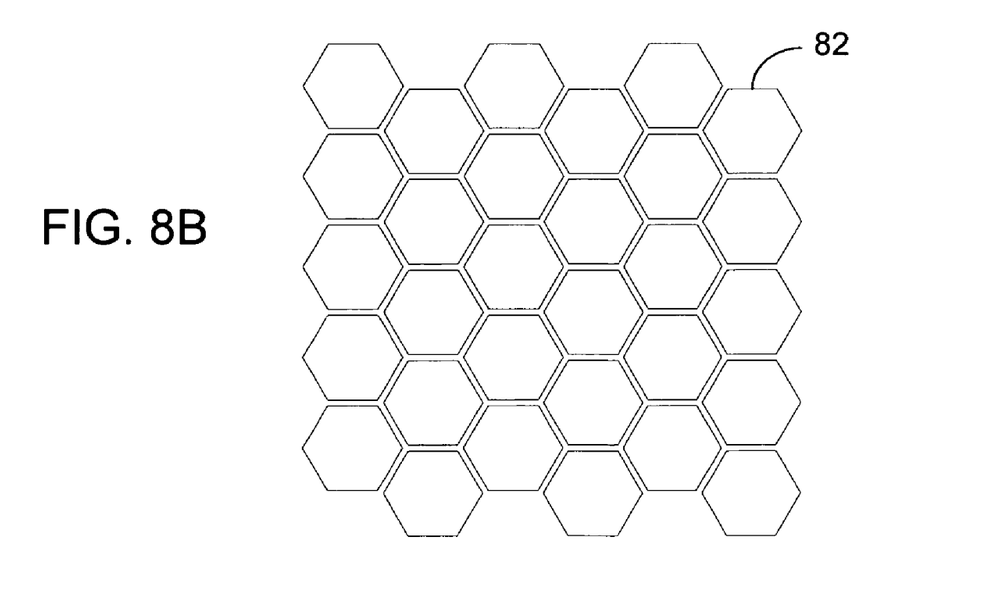

In the example shown in FIG. 6, the primary coils 26 are shown as having a circular shape. Other shapes of the primary coils may be used. For instance, square coils 81 or hexagonal coils 82 may be used, as illustrated in FIGS. 8A and 8B, respectively. Compared with circular coils, the square and hexagonal coils have the advantage of providing more complete coverage of the inductive powering surface, but have the disadvantage of less uniform magnetic flux distribution within the coil.

In a preferred embodiment, the primary coils are sized such that multiple primary coils overlap with the secondary coil when the portable device is placed on the inductive powering surface. Generally, using small primary coils allows better power transfer efficiency to be obtained, as the overlapping between the primary coils and the secondary coil can be better defined, and only those primary coils that overlap with the secondary coil are energized to excite the secondary coil. The dimension of the primary coils may be, for example, from one to several centimeters, depending on technical considerations such as the desired inductance, the powering frequency, the power to be transferred per coil, the size of the supported devices to be powered by the powering surface, the power requirement of the supported devices, etc. As to the size of the supported devices, the primary coils are preferably small enough so that there can be enough number of primary coils under the footprint of the device to provide adequate power to it.

Figure 4:
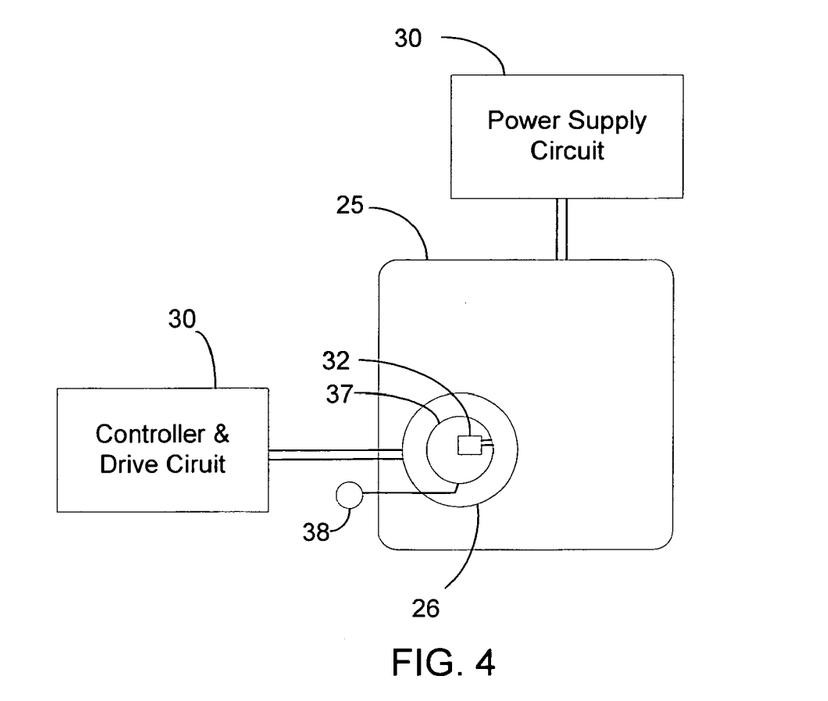
FIG. 4 is a schematic diagram showing an alternative embodiment in which the RFID chip of the portable device has a sensing coil separate from the secondary coil.

To reduce magnetic leakage and radio interference, it may be preferable to surround the primary and the second coils with magnetic material such that they form an active transformer circuit. For example, the magnetic shielding may be achieved by using a ferrite or sendust sheet under the primary coils and an enclosed ferrite core fore the second coil. The magnetic shielding, however, may cause the inductance of the coils to change with the effective air gap of the magnetic circuit. To keep the resonance frequency of the RFID coil roughly constant, a high-Q circuit element may be added to the RFID coil. A simple way to create a high-Q circuit is to use a mechanical oscillator, such as a quartz crystal chosen such that the sensing frequency (e.g., 13.56 MHz) is between the series resonant frequency and the anti-resonant frequency for the crystal. As shown in FIG. 4, the crystal 38 is connected to the RFID sensing coil and from a resonant circuit with the coil and an additional capacitor, and optionally a resistor for controllably reducing the Q of the circuit if necessary. As another example, the high-Q element can be a MEMS mechanical resonator.

Figure 9:
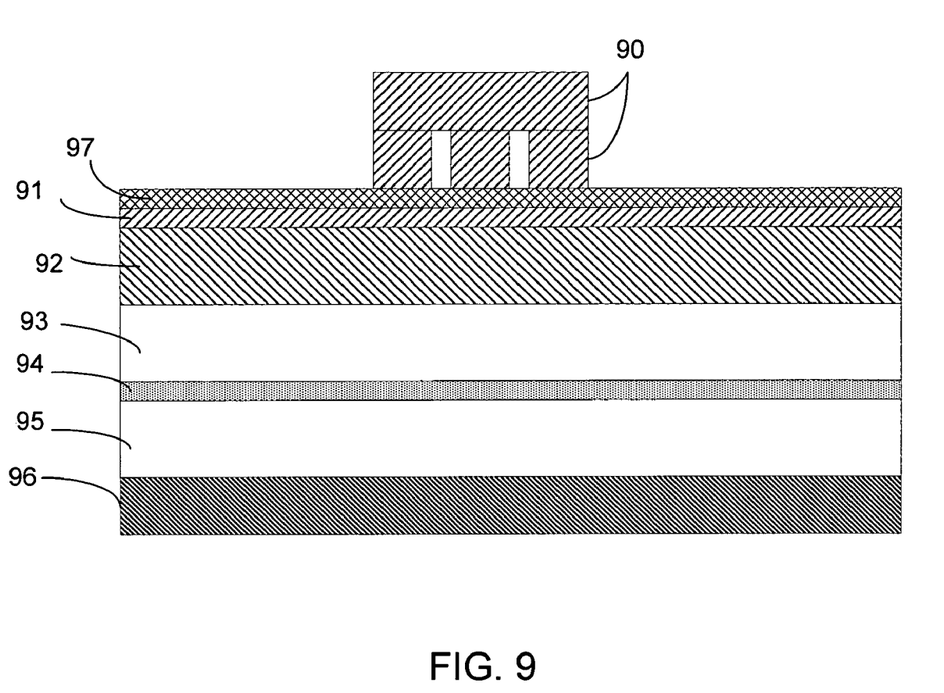
FIG. 9 is a cross-sectional view of an embodiment of the inductive powering surface with layered construction.

FIG. 9 shows a cross-sectional view of one implementation of the inductive powering surface. A core 90 of a secondary coil of a portable device is also shown in FIG. 9. The layer 91 is the circuit board or layers for the coils. The layer 94 is the circuit board or layers for the lead wires of the coil matrix. The layers 93 and 95 are non-magnetic spacer layers used to reduce the inductance of the lead wires. The layers 92 and 96 and the secondary core 80 are made of magnetic material such as ferrite. The layer 97 is an optional decorative lamination at the very top of the inductive powering surface.

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. A system for powering portable devices, comprising:
a powering device having an inductive powering surface with a plurality of primary coils formed therein and a controller for selectively energizing the primary coils; and
a portable device having a secondary coil, a power supply circuit coupled to the secondary coil, and a passive locator device, the passive locator device being configured to be powered up by receiving transmissions of a sensing frequency and to transmit a response at the sensing frequency,
the controller of the powering device being programmed to scan the primary coils to locate the secondary coil by energizing each of the primary coil at the sensing frequency and sensing whether a response by the passive locator device is received by said each primary coil, and to energize a group of primary coils located under the secondary coil at a power transfer frequency to transfer power to the portable device via inductive coupling between the group of primary coils and the secondary coil, the sensing frequency being significantly higher than the power transfer frequency.

2. A system as in claim 1, where the passive locator device includes an antenna and a RFID chip.

3. A system as in claim 2, wherein the RFID chip is configured to include in the response powering information regarding powering the portable device.

4. A system as in claim 3, wherein the powering information includes a size of the secondary coil.

5. A system as in claim 3, wherein the powering includes a power transfer rate for the portable device.

6. A system as in claim 2, wherein the secondary coil of the portable device is used as the antenna of the passive locator device.

7. A system as in claim 6, wherein the controller of the powering device has driver circuits for energizing the primary coils, wherein the primary coils are wired such that the primary coils on each row or column of the matrix are connected to one driver circuit for energizing thereof.

8. A system as in claim 1, wherein the primary coils are arranged in a two-dimensional matrix having rows and columns on the inductive powering surface.

9. A system as in claim 1, wherein the inductive powering surface has a multi-layered structure including a circuit layer in which the primary coils are formed and a shielding layer formed of a magnetic shielding material and disposed under the circuit layer.

10. A portable device comprising:
a power supply circuit;
a secondary coil coupled to the power supply circuit for powering the power supply circuit when the secondary coil is energized via inductive coupling by alternative magnetic fields at a power transfer frequency; and
a passive locator device configured to be powered up by receiving transmissions from at least a primary coil at a sensing frequency without drawing a current from the power supply circuit and to transmit a response to one or more primary coils at the sensing frequency to indicate a presence and location of the secondary coil, said sensing frequency being significantly higher than the power transfer frequency.

11. A portable device as in claim 10, where the passive locator device includes an antenna and a RFID chip.

12. A portable device as in claim 11, wherein the RFID chip is configured to include in the response powering information regarding powering the portable device.

13. A portable device as in claim 12, wherein the powering information includes a size of the secondary coil.

14. A portable device as in claim 12, wherein the powering information includes a power transfer rate for the portable device.

15. A portable device as in claim 11, wherein the secondary coil of the portable device is used as the antenna of the passive locator device.

16. A portable device as in claim 11, including a mechanical oscillator coupled to the antenna of the passive locator device to form a high-Q circuit.

17. A method of powering a portable device, comprising:
placing the portable device on an inductive powering surface of a power device, the powering surface having a plurality of primary coils disposed thereon, and wherein the portable device has a secondary coil therein for inductive coupling with the primary coils;
scanning the primary coils to identify a location of the secondary coil on the inductive powering surface, including transmitting a sensing frequency at a sensing frequency selected to powering surface, including transmitting a sensing frequency at a sensing frequency selected to excite a passive locator device in the portable device and sensing whether a response from the passive locator device is detected at a location of said each primary coil; and
energizing a group of primary coils located under the secondary coil at a power transfer frequency to transfer power to the portable device via inductive coupling between the group of primary coils and the secondary coil, the sensing frequency being significantly higher than the power transfer frequency.

18. A method as in claim 17, including a step of deriving from the response of the passive locator device powering information regarding powering the portable device, and wherein the step of energizing operates the group of primary coils based on the powering information.

19. A method as in claim 18, wherein the powering information includes a power transfer rate for powering the portable device.

20. A method as in claim 17, wherein the passive locator device is a RFID device, and the sensing frequency is selected for activating the RFID device.

* * * * *